A. H. PHELPS.
Water Cooler.
No. 23,605.
Patented April 12, 1859.
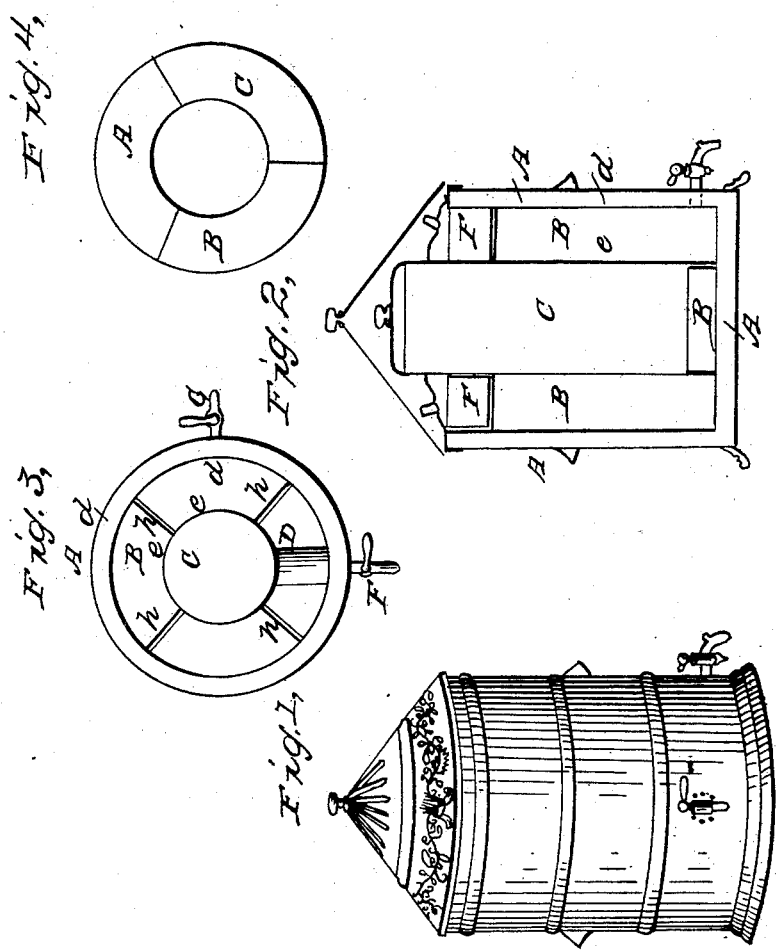

UNITED STATES PATENT OFFICE.

AUGUSTUS H. PHELPS, OF TRENTON, MICHIGAN.

WATER-COOLER.

Specification of Letters Patent No. 23,605, dated April 12, 1859.

*To all whom it may concern:*

Be it known that I, AUGUSTUS H. PHELPS, of Trenton, in the county of Wayne, State of Michigan, have invented an Improved Water-Cooler, Ice-Cream Freezer, and Refrigerator, and do hereby declare that the following is a full, clear, and exact description of the construction and operation of the same, reference being had to the accompanying drawings and to the letters of reference marked thereon.

Figure 1 is a perspective view; Fig. 2, longitudinal view; Fig. 3, trasverse section; Fig. 4, detached section.

The nature of my invention consists in having the substance to be cooled separate from the cooling compound and protection of faucet from the action of cold by being surrounded by air chamber.

To enable others skilled in the art to make and use my invention I will proceed to describe its construction and operation.

I construct my water cooler, &c., in the following form: First, a wall of sheet zinc $e$ of circular form forming tank C for the purpose of receiving fresh water or other substances. Surrounding zinc wall $e$ is a wall of sheet copper $d$, a space intervening between walls $e$ and $d$ marked B to be filled with ice and salt or other cooling compound for the purpose of cooling water and freezing ice cream and other substances in tank C. The outside casing is of tin. Between that and copper wall $d$ is filled with pulverized charcoal, which being a nonconductor of heat will materially assist in preserving the ice, &c., in space B; also a faucet marked G extending through space A and sheet copper wall $d$ for the purpose of drawing off waste water that may accumulate in space B. At right angle from faucet G is faucet F, extending through spaces A, wall $d$, space B, to zinc wall $e$ and tank C, for the purpose of drawing off fresh water or other substances when required. Around faucet F is an air chamber of circular form marked D, extending through space A, copper wall $d$, space B, to zinc wall $e$, to prevent faucet F from freezing, the air being admitted to the chamber by perforations made in outside casing. $h$ are braces to hold tank C in place. There are separate covers for space B and tank C. Extending over all is a cover of convex form.

The refrigerator is constructed of zinc or tin and is of circular form.

What I claim and desire to secure by Letters Patent is—

1. The arrangement or combination of the tank C the refrigerator B and non-conducting chamber or casing.

2. I also claim in combination with preceding the air chamber D surrounding the faucet F all the parts arranged substantially as and for the purpose described.

AUGUSTUS H. PHELPS.

Witnesses:
L. D. COVILLE,
ALEXANDER DEAL.